United States Patent [19]

Durkee et al.

[11] E Re. 30,923

[45] Reissued May 4, 1982

[54] CALCULATOR KEYBOARD SWITCH WITH DISC SPRING CONTACT AND PRINTED CIRCUIT BOARD

[75] Inventors: Gilbert H. Durkee, Fort Wayne, Ind.; Per G. Wareberg, Ottawa, Canada; Alan C. Yoder, Fort Wayne, Ind.

[73] Assignee: Bowmar Instrument Corporation, Fort Wayne, Ind.

[21] Appl. No.: 93,686

[22] Filed: Nov. 13, 1979

Related U.S. Patent Documents

Reissue of:

[64] Patent No.: Re. 29,440
Issued: Oct. 11, 1977
Appl. No.: 665,325
Filed: Mar. 9, 1976

Which Is a Reissue of:

[64] Patent No.: 3,796,843
Issued: Mar. 12, 1974
Appl. No.: 320,147
Filed: Jan. 2, 1973

[51] Int. Cl.[3] ..... H01H 13/70

[52] U.S. Cl. ..... 200/5 A; 200/159 B; 200/275; 200/279; 200/292

[58] Field of Search ..... 200/5 A, 5 R, 275, DIG. 1

[56] References Cited

U.S. PATENT DOCUMENTS

| | | | |
|---|---|---|---|
| 3,120,583 | 2/1964 | Cornell | 200/5 R |
| 3,133,170 | 5/1964 | Nanninga | 200/67 DB |
| 3,416,119 | 12/1968 | van Benthuysen et al. | 338/174 |
| 3,600,528 | 8/1971 | Leposavic | 200/5 |
| 3,643,041 | 2/1972 | Jackson | 200/5 A |
| 3,653,038 | 3/1972 | Webb et al. | 200/DIG. 1 X |
| 3,673,357 | 6/1972 | Molchan | 200/5 A |
| 3,684,842 | 8/1972 | Boulanger | 200/5 R |
| 3,693,129 | 9/1972 | Shimizu | 338/183 |
| 3,696,411 | 10/1972 | Kilby et al. | 200/5 A X |
| 3,697,711 | 10/1972 | Tetrick | 200/5 A X |
| 3,707,609 | 12/1972 | Dapot et al. | 200/5 A X |
| 3,710,209 | 1/1973 | Webb et al. | 200/DIG. 1 X |
| 3,725,907 | 4/1973 | Boulanger | 200/5 A X |
| 3,731,014 | 5/1973 | Brady | 200/275 X |
| 3,731,030 | 5/1973 | Holzer | 200/292 X |
| 3,732,521 | 8/1973 | Havenstine et al. | 338/202 |
| 3,749,859 | 7/1973 | Webb et al. | 200/5 A X |
| 3,751,612 | 8/1973 | Hansen | 200/DIG. 1 X |
| 3,800,104 | 3/1974 | Lien et al. | 200/5 A |
| 3,806,673 | 4/1974 | Boulanger | 200/5 A |
| 3,898,421 | 8/1975 | Suzumura | 200/159 B |
| 3,941,953 | 3/1976 | Misson et al. | 200/5 A X |

FOREIGN PATENT DOCUMENTS

| | | |
|---|---|---|
| 2006176 | 9/1970 | Fed. Rep. of Germany . |
| 1615880 | 1/1971 | Fed. Rep. of Germany . |
| 1774893 | 12/1971 | Fed. Rep. of Germany . |
| 2120121 | 12/1971 | Fed. Rep. of Germany . |
| 7210514 | 6/1972 | Fed. Rep. of Germany . |
| 2221675 | 12/1972 | Fed. Rep. of Germany . |
| 2240728 | 2/1974 | Fed. Rep. of Germany . |
| 2341521 | 2/1974 | Fed. Rep. of Germany . |
| 2306268 | 5/1974 | Fed. Rep. of Germany . |
| 2356024 | 5/1974 | Fed. Rep. of Germany . |
| 162595 | 10/1974 | Hungary . |
| 170381 | 7/1980 | Hungary . |
| 47-18061 | 10/1972 | Japan . |
| 48-144617 | 12/1973 | Japan . |
| 393695 | 8/1977 | Sweden . |
| 939636 | 10/1963 | United Kingdom . |
| 983892 | 2/1965 | United Kingdom . |
| 1060305 | 3/1967 | United Kingdom . |
| 1124535 | 8/1968 | United Kingdom . |
| 1352076 | 5/1974 | United Kingdom . |
| 597352 | 1/1978 | U.S.S.R. . |

*Primary Examiner*—James R. Scott
*Attorney, Agent, or Firm*—Gust, Irish, Jeffers & Hoffman

[57] ABSTRACT

A keyboard switch assembly including a printed circuit board having four switch terminals on one side of the board, three of the terminals being arranged in a triangle and the fourth disposed within the triangle. Conductors on the one side of the board are respectively joined to the interior terminal and at least one of the three terminals. A conductive, generally triangular, snap-acting dome switch member is provided having arcuate apices, projections being respectively formed from the apices and respectively engaging the three terminals thereby spacing the periphery of the switch element from the one surface of the printed circuit board and the conductors thereon, at least the conductor connected to the interior terminal extending under the dome. The switch element has a fourth projection formed from the interior of the dome adjacent the center thereof which is in registry with the interior terminal and engages that terminal when the dome is deflected thereby completing an electrical circuit between the three terminals and the interior terminal. A layer of insulating material covers the conductors exclusive of the terminals. A sheet of insulating material covers the insulating layer and has an opening therein which receives and locates the switch member. Another sheet of insulating material covers the first sheet and the switch member. A plate covers the second insulating sheet and has an opening therein which receives a push button in registry with the switch element, depression of the push button actuating the dome of the switch member to a non-overcenter, deflected position in which the interior projection on the dome engages the interior switch terminal.

23 Claims, 14 Drawing Figures

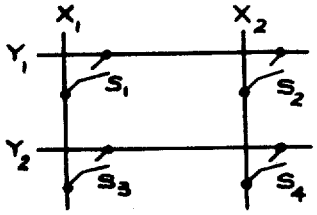
FIG.1
FIG.2
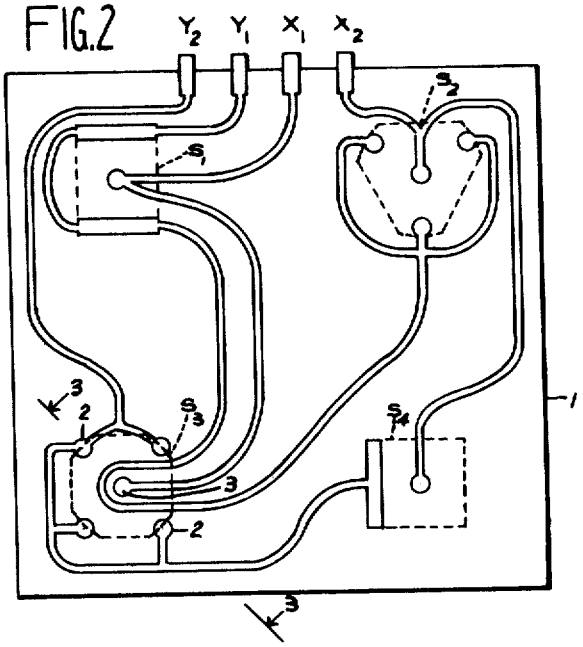
FIG.3
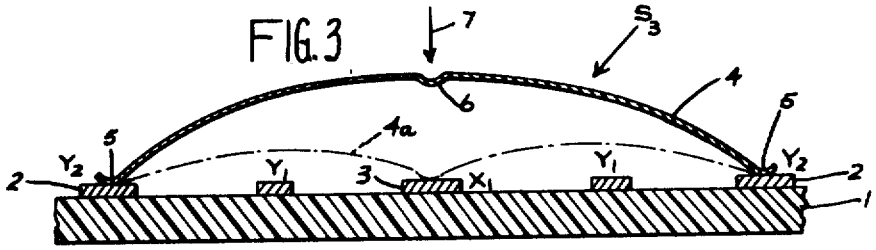
FIG.13
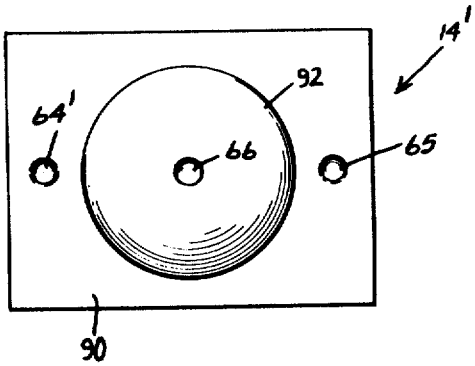
FIG.14
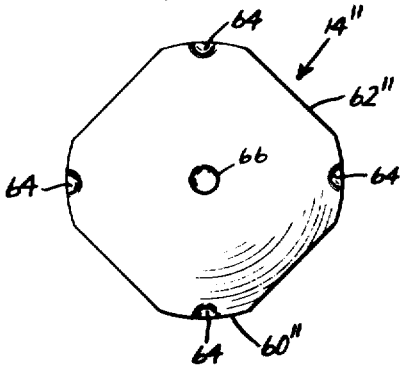

CALCULATOR KEYBOARD SWITCH WITH DISC SPRING CONTACT AND PRINTED CIRCUIT BOARD

Matter enclosed in heavy brackets [ ] appears in the original patent but forms no part of the first and this reissue specification; matter printed in italics indicates the additions made by the first reissue. Matter enclosed in double heavy brackets [ [ ] ] appears in the first reissue patent but forms no part of this reissue specification; matter printed in bold face indicates the additions made by this reissue.

BACKGROUND OF THE INVENTION

1. Field of the Invention

This invention relates generally to a keyboard switch assembly of the type used in electronic calculator apparatus.

2. Description of the Prior Art

Keyboard switches have been provided employing a conductive snap-acting dome member as the switch element, such keyboard switches being shown for example in U.S. Pat. Nos. *486,212,* 3,643,041 and 3,684,842, German Pat. [Nos. 486,212 and] *No.* 1,806,241, and IBM Technical Disclosure Bulletin No. 12, Vol. 7, May, 1965, p. 1168 entitled "Snap-Action Membrane Switch Keyboard." Another keyboard switch assembly of the same general type manufactured by Texas Instruments Incorporated employs a printed circuit board having conductors on one surface thereof, staples extending through the board from the other surface to the one surface and being soldered to selected conductors thereon, and snap-acting domes cooperating with the portions of the staples on the other side of the board to perform the switching function, that assembly being shown in U.S. Pat. No. 3,727,907. Yet another type of keyboard switch manufactured by [Colorodo] *Colorado* Instruments Corp. incorporates a printed circuit board having conductors on both surfaces thereof, the board having plated openings extending therethrough connected to certain conductors, and snap-acting domes cooperating with the plated openings to perform the switching function.

SUMMARY OF THE INVENTION

The keyboard switch assemblies of the type described above known to the present applicants employ some combination of double sided printed circuit boards, soldered connections, and/or a conductive ground plate in addition to a printed circuit board, these features complicating assembly thus adding appreciably to the cost. It is therefore desirable to provide a keyboard switch assembly of the general type described above which utilizes a single sided printed circuit board and which does not require soldered connections or an additional conductive ground plate.

The present invention, in its broader aspects, is embodied in a keyboard switch assembly including a push button manually actuable from an inactive to a switch-actuating position, and a conductive switch member including a resilient element actuated by the push button from a normal to a deflected position, and comprises an insulative board having opposite surfaces with one of the surfaces having first and second conductors thereon, the first conductor including a first switch terminal portion and the second conductor including a second switch terminal portion. The switch element faces the one surface of the printed circuit board and the conductors and has a first contact area thereon spaced from the center area of the element, the first contact area engaging the first terminal portion. The center area of the element forms a second contact area in registry with the second terminal portion and engaging the same when the element is in its deflected position thereby electrically connecting the first and second terminal portions and their respective conductors.

It is accordingly an object of the invention to provide an improved keyboard switch assembly.

Another object of the invention is to provide an improved keyboard switch assembly of the type employing a conductive snap-acting dome member as the switch element.

A further object of the invention is to provide an improved keyboard switch assembly of the type employing a snap-acting dome member as the switch element in which a single sided printed circuit board is utilized and soldered connections and/or conductive ground plates are eliminated.

The abovementioned and other features and objects of this invention and the manner of attaining them will become more apparent and the invention itself will be best understood by reference to the following description of an embodiment of the invention taken in conjunction with the accompanying drawings.

BRIEF DESCRIPTION OF THE DRAWINGS

FIG. 1 is a schematic illustration of a simplified, two-by-two XY keyboard switching matrix;

FIG. 2 is a top view showing an insulative board with XY conductors and switch terminals thereon arranged in a pattern in accordance with the invention to provide the keyboard switch matrix of FIG. 1;

FIG. 3 is a cross-sectional view taken generally along the line [2—2] *3—3* of FIG. 2 and showing the basic switching element employed in the invention;

FIG. 13 is a top view of a modified form of the switch element shown in FIGS. 11 and 12; and FIG. 14 is a top view of a modified form of the switch element shown in FIGS. 4–10.

DESCRIPTION OF THE PREFERRED EMBODIMENTS

Figure 4:
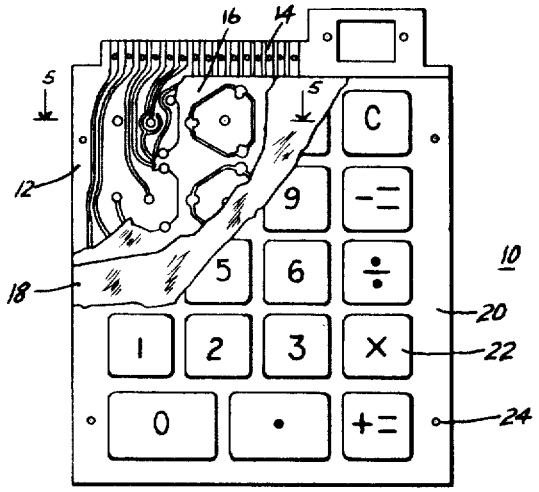
FIG. 4 is top view, partly broken away, showing the preferred embodiment of the improved keyboard switch assembly of the invention.

In general, a keyboard switch assembly for an electronic device, such as a calculator, can be considered to be an XY grid or matrix of conductors with the X conductors insulated from the Y conductors, a particular function being identified by making electrical contact between a selected X conductor and a selected Y conductor. Referring to FIG. 1 of the drawing, a simplified, two-by-two switching matrix is shown comprising $X_1$ and $X_2$ conductors respectively insulated from $Y_1$ and $Y_2$ conductors, the switching functions being performed by switches $S_1$–$S_4$. It will be understood that the number of X or Y conductors in the keyboard matrix can be any integer equal to or larger than one, and that the number of possible switching functions is equal to the product of the number of X conductors and the number of Y conductors. Momentary contact push button switches are customarily employed to make the necessary contact between the X and Y lines.

The Texas Instruments keyboard switch assembly referred to above employs a single sided printed circuit board with the requisite insulation at the XY crossovers being provided by conducting U-shaped staples extending through the board with their legs soldered to the conductors on one side and their bight portions engaging the other side of the board. The Colorado Instruments keyboard switch assembly referred to employs a two-sided printed circuit board with the X conductors on one side thereof and the Y conductors on the other, plated through-holes being used to provide X contacts on the same side of the board as the Y contacts. In both of those assemblies, the printed circuit board serves as an insulator between the X and Y conductors with staples or plated through-holes being used to bring the X and Y contact points to the switching side of the board.

In the keyboard switch assembly of the present invention, the thickness of the printed circuit board is not used as an insulator between the X and Y conductors, there being no conductors extending through the board to provide electrical contact from one side to the other. Referring now to FIGS. 2 and 3, in accordance with the invention an insulative board 1 is provided having X and Y conductors secured to the switching side thereof, the conductors being arranged in a pattern and having terminal portions 2, 3 arranged to cooperate with the respective switching elements S so as to make contact between selected X and Y conductors without touching other conductors.

Switching elements S are formed of conductive, resilient material, each switching element S having edge or peripheral contact areas 5 engaging one or more Y terminal portions 2 and having a normal position, as shown in solid lines in FIG. 3, with it center contact area 6 spaced from a respective X terminal portion 3, switching element 4 also being spaced from other X and/or Y conductors, as shown. Upon application of a downward force on switching element 4, as shown by arrow 7, such as that applied by manual actuation of a push button, switching element 4 is deflected to a position as shown in dashed lines at 4a with its center contact area 6 making contact with a respective X terminal portion 3 thus electrically connecting the respective X and Y conductors. It will be observed that in its deflected position, switching [switching] element 4 does not contact the other conductors, such as conductors $Y_1$ therebeneath. Upon release of the downward force 7, switching element 4 resiliently returns to its normal position thus breaking the electrical connection between the respective X and Y conductors.

In FIG. 2, the orientation of switching elements S with the respective X and Y terminal portions is shown in dashed lines. For example, switching element S1 may be of the type shown in FIG. 13, switching element S2 may be of the type shown in FIGS. 4–10, switching element S3 may be the type shown in FIG. 14, and switching element S4 may be the type shown in FIGS. 11 and 12, it being understood that all switching elements in a given keyboard switch assembly will generally have the same configuration.

Referring now to FIGS. 4 through 10 of the drawings, the preferred embodiment of the improved keyboard switch assembly of the invention, generally indicated at 10, comprises single sided printed circuit board 12, snap-acting dome switch members 14, insulative switch member retaining sheet 16, insulative cover sheet 18, cover member 20, and push buttons 22. Switch members 14 and insulative sheets 16, 18 are sandwiched between printed circuit board 12 and cover member 20 and the keyboard switch assembly is held in assembled relation by rivets 24. The illustrated embodiment of keyboard switch assembly 10 is intended for use in an electronic calculator.

While keyboard switch assembly 10 incorporates a plurality of switching sub-assemblies 28 each comprising one push button 22, one snap-acting dome switch member 14, and associated switch terminals and conductors on upper surface 26 of printed circuit board 12, each of the switching sub-assemblies 28 is similar and functionally identical and thus description of one such [subassembly] *sub-assembly* 28 will suffice.

Figure 6:
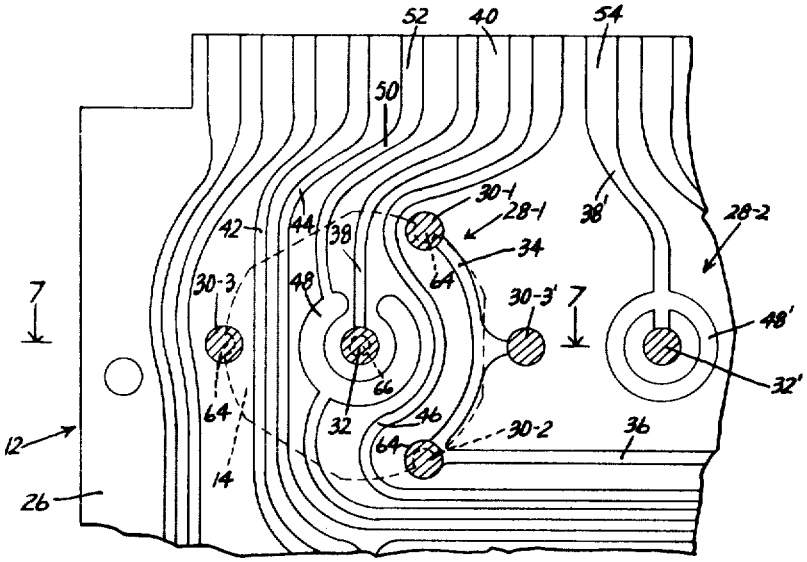
FIG. 6 is an enlarged fragmentary view showing a portion of the printed circuit board employed in the preferred embodiment.
Figure 7:
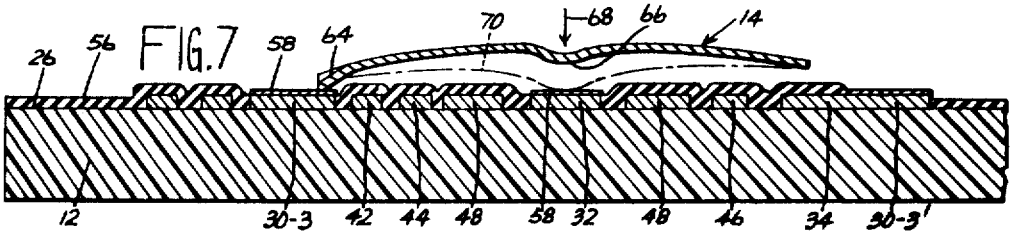
FIG. 7 is a cross-sectional view taken along the line 7—7 of FIG. 6.

Referring now particularly to FIGS. 6 and 7, printed circuit board 12 comprises a sheet of rigid plastic material having one surface 26 copper clad, the conductors and terminals on surface 26 being formed by photoengraving techniques as is well known to those skilled in the art. Each switching sub-assembly 28 comprises three switch terminals 30 on surface 26 and disposed in an equilateral triangle, and a center switch terminal 32 on surface 26 disposed in the center of the triangle formed by outer terminals 30. In the particular switching sub-assembly 28-1 shown in FIG. 6, two of the outer terminals 30-1 and 30-2 are connected by conductor 34 on upper surface 26 of board 12, terminal 30-2 having another conductor 36 on upper surface 26 connected thereto. Due to the geometry of the conductor pattern on the upper surface 26 of board 12, terminal 30-3 of switching sub-assembly 28-1 does not have a conductor connected thereto however, in other of the switching sub-assemblies 28, all three of the switching terminals 30 may be connected by one conductor. In the particular circuit board pattern shown outer terminal 30-3′ of switching sub-assembly 28-2 is also connected to conductor 34.

Central terminal 32 of switching assembly 28-1 is connected by conductor 38 on upper surface 26 to external terminal 40. The other conductors on upper surface 26 of board 12, such as conductors 42, 44 and 46 which pass through the triangle defined by outer terminals 30 of switching assembly 28-1, connect other external terminals to the terminals of other switching sub-assemblies.

Conductor 48 on upper surface 26 of board 12 partially surrounds central terminal 32 of switching sub-assembly 28-1 being spaced therefrom and from conductor 38. In the particular printed circuit pattern shown, conductor 48 is connected in conductor 50 on upper surface 26 of board 12 which connects external terminal 52 to a terminal of another switching [subassembly] *sub-assembly* 28. In other switching sub-assemblies, such as [subassembly] *sub-assembly* 28-2, conductor 48′ completely surrounds central terminal 32′ and is connected to conductor 38′ on upper surface 26 which connects central terminal 32′ to external terminal 54.

Referring now particularly to FIG. 7, upper surface 26 of printed circuit board 12 and the conductors thereon are covered with a thin layer 56 of insulating material, terminals 30, 32 being masked during application of insulative coating 56 so that the terminals are not so-coated. Terminals 30, 32 are preferably plated, such as by plating with gold over nickel, as at 58.

Figure 5:
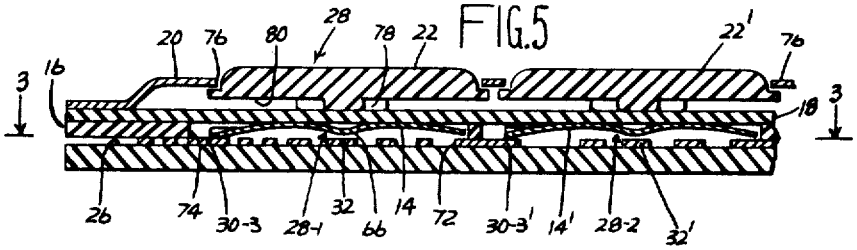
FIG. 5 is a cross-sectional view taken along the line 5—5 of FIG. 4.

While the conductors, terminals, insulative layer 56, and plating 58 are shown for purposes of illustration in FIGS 5 and 7 as having appreciable thickness, it will be understood that actually these elements are very thin.

Figure 8:
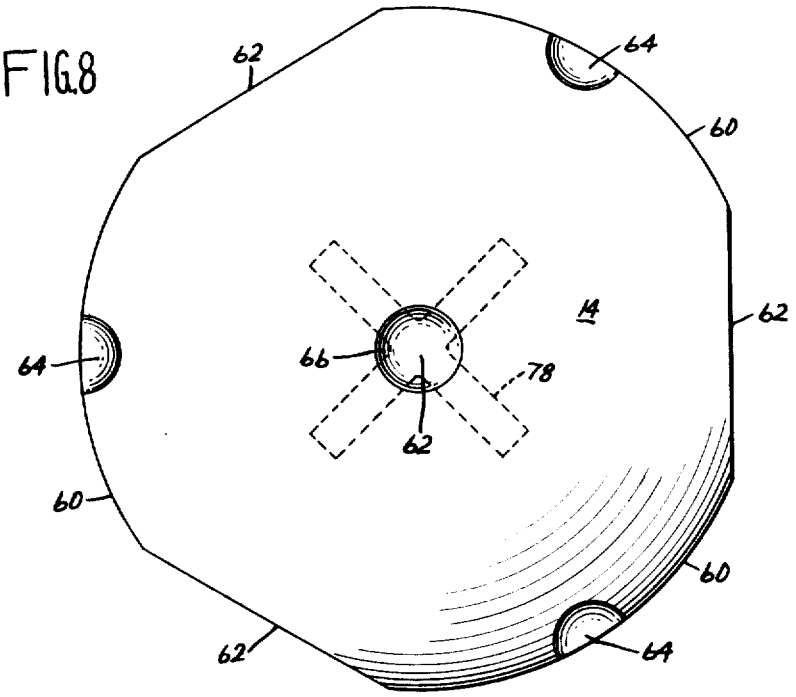
FIG. 8 is a top view showing the snap-acting dome switch member employed in the preferred embodiment.

Referring now additionally to FIG. 8, in the preferred embodiment, snap-acting dome switch member 15 has a generally triangular configuration with apices 60 which are arcuately curved about center 62, apices defining flat sides 62 therebetween. Switch member 14 may also be said to be generally circular with portions removed to form chords 62 between arcuate portions 60. Projections or dimples 64 are formed downwardly from apices 60 and a center projection or dimple 66 is formed projecting into the interior of the dome.

Snap-acting dome switch member 14 of switching sub-assembly 28-1 is disposed over and facing upper surface 26 of board 12, conductors 34–48, and center terminal 32, outer projections 64 respectively engaging outer terminals 30 and thus spacing the periphery of switch member 14 above the conductors and terminals, as best seen in FIG. 7. Center projection 66 is in registry with and spaced from center terminal 32 in the normal position of snap-acting dome switch member 14, as shown in solid lines in FIG. 7. Application of a downward force on switch member 14, as shown by an arrow 68, will deflect member 14 from its normal position to a non-overcenter position, as shown in dashed lines at 70, in which center projection 66 engages center contact 32 thereby electrically connecting center contact 32 to outer contacts 30 to complete the desired electrical circuit.

Conductor 48 partially surrounding center terminal 32 (or 48′ completely surrounding center terminal 32′), and its insulative coating 56, forms a pad preventing damage to center projection 66 on snap-acting dome switch member 14, i.e., application of excessive force in direction 68 on switch member 14 will cause the area surrounding projection 66 to move into engagement with the insulation covering conductor 48 thus preventing further downward movement of the dome and damage to projection 66.

Figure 9:
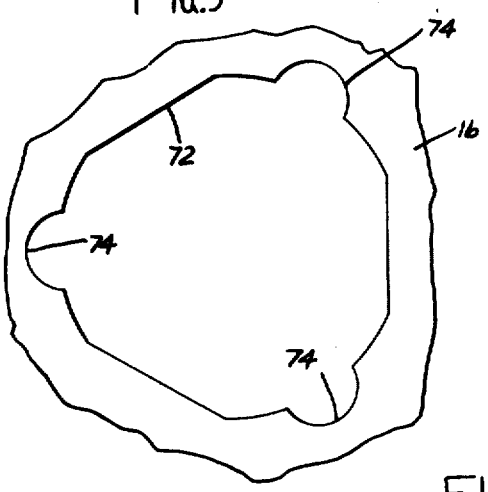
FIG. 9 is a fragmentary view showing the configuration of one of the openings in the switch element retaining member.

Retaining sheet 16, which covers insulative layer 56 on upper surface 26 of circuit board 12, is formed of a sheet of relatively thin flexible insulating material and has openings 72 therein which respectively receive and locate snap-acting dome switch members 14, openings 72 generally conforming to the configuration of switch members 14 but having cut-out portions 74 respectively aligned with projections 64 which respectively expose portions of outer terminals 30 (FIG. 9).

Cover sheet 18 is formed of an imperforate sheet of relatively thin, flexible insulating material and covers retaining sheet 16 and switch members 14. Cover member 20 covers sheet 18 and has openings 76 therein which receive push buttons 22. Each push button 22 has an X-shaped projection 78 formed on its bottom surface 80, projection 78 being in registry with center projection 66 of the respective switch member 14. Projection 78 engages the area of cover sheet 18 over center projection 66 but normally applies no force thereto other than what little force is attributable to its own weight which is insufficient to deflect switch member 14 to its actuated position 70. Application of manual finger pressure on a particular push button 22 results in the application of force in direction 68 through cover sheet 18 on the respective snap-acting dome switch member 14 thereby actuating the switch member to its non-overcenter, deflected position 70 to perform the desired switching function. Upon release of manual finger pressure on push button 22, the respective switch member 14 resiliently returns to its normal position thus opening the circuit previously established and returning the respective push button 22 to its normal, inactive position.

Figure 11:
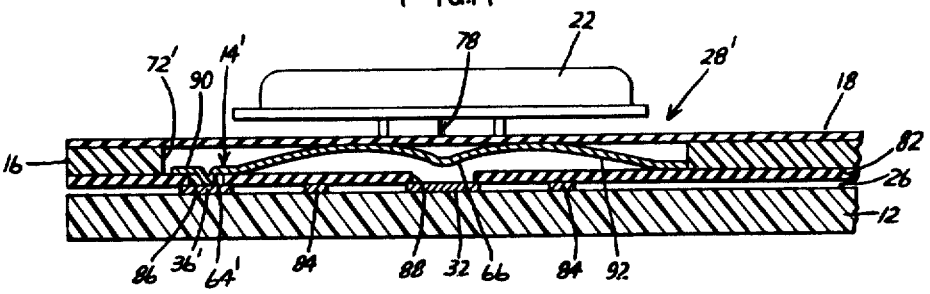
FIG. 11 is a fragmentary cross-sectional view showing another embodiment of the invention.
Figure 10:
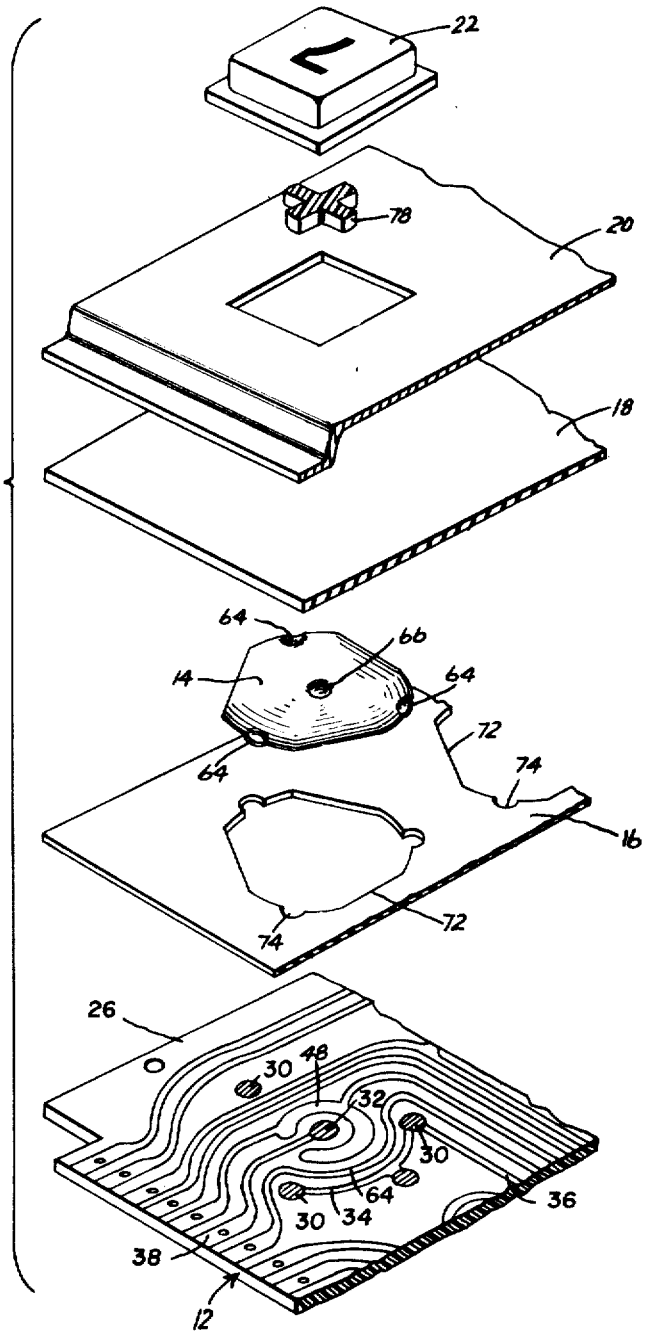
FIG. 10 is a fragmentary, exploded perspective view further showing the preferred embodiment of the invention.

Referring now to FIG. 11 in which like elements are indicated by like reference numerals and similar elements by primed reference numerals, here, each switching sub-assembly 28′ comprises center terminal 32 on upper surface 26 of printed circuit board 12 and a single outer terminal 30′ also on upper surface 26, center terminal 32 and outer terminal 30′ being connected by conductors (not shown) on upper surface 26 to external terminals (also not shown). Sheet 82 formed of relatively thin insulating material covers upper surface 26 and conductors 84 thereon and has openings 86, 88 respectively exposing terminals 30′, 32.

In this embodiment, snap-acting dome switch member 14′ has a generally rectangular configuration with flat portion 90 integrally joined to the periphery of domed portion 92. Projection 64′ is formed from flat portion 90 and projection 66 is formed from the center area of dome 92.

Flat portion 90 of switch member 14′ is supported on the upper surface of insulator 82 with projection 64′ extending through opening 86 and engaging terminal 30′, and with projection 66 in registry with opening 88 and terminal 32. Insulative retaining member 16 covers insulator 82 and has openings 72′ therein which receive and locate switch members 14′, openings 72′ conforming to the rectangular configuration of switch members 14′.

Cover sheet 18 covers retaining member 16 and cover member 20 (not shown in FIG. 11) in turn covers cover sheet 18 and has openings 76 therein which receive and locate push buttons 22.

Figure 12:
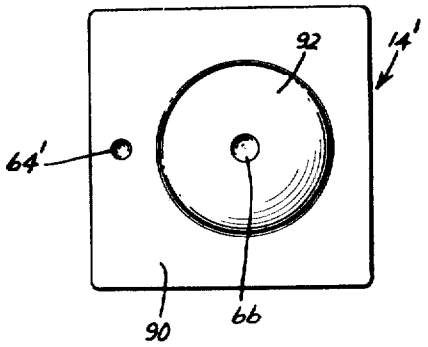
FIG. 12 is a top view of the switch element employed in the embodiment of FIG. 11.

The switching action of the embodiment of FIGS. 11 and 12 is virtually identical to that of FIGS. 4–10, i.e., application of manual finger pressure on a push button 22 causes X-shaped projection 78 to apply downward force on the center area of a respective dome 92 through cover sheet 18 thereby actuating dome 92 from its normal position, as shown in FIG. 11, to its non-overcenter, deflected position in which projection 66 extends through opening 88 in insulator 82 and engages center contact 32 thereby to provide the switching function.

Referring now to FIG. 13 in which like elements are indicated by like reference numbers and similar elements by primed reference numerals, a modification of the switch element of FIGS. 11 and 12 is shown having an additional contact projection 65 formed in flat portion 90 on the opposite side of domed portion 92 from projection 64′.

Referring now to FIG. 14 in which like elements are again indicated by like reference numerals and similar elements by double primed reference numbers, a modification of the switching element 14 shown in FIGS. 4–10 is shown (referring particularly to FIG. 8) in which domed switching element 14″ has a generally rectangular configuration with arcuate corners 60″ joined by straight sides 62″, contact projections or dimples 64 being formed in corners 60″. It will be observed that switching element 14″ may be formed by cutting straight edges 62″ from a circular snap-acting dome.

While snap-acting dome switching elements have been shown in the preferring embodiment, it will be understood that the audible and tactile feedback provided by the "oil canning" action of a dome is not required for the switching function and that other types of switching elements can be employed; the basic requirement of the switching element is that it be capable of being depressed to complete a circuit between respective X and Y lines, have the required memory or resilience to return to its initial position upon removal of the actuating force, and have a configuration which will make the required electrical connection between a selected XY conductor pair when depressed without touching other conductors interconnecting contact points for other switches on the same board. While an insulating coating or layer is disclosed covering the circuitry other than the terminal portions, such an insulative coating or layer is not a requirement since with proper arrangement of the conductive pattern and proper switch element deflection characteristics, the insulating coating can be eliminated.

The switching element configuration shown in FIGS. 8 and 14 is preferred since the provision of three or four apices or corners will contact projections or dimples therein provides resting points for the dome around the periphery thereof, the intermediate flat sides cut from the dome insuring proper alignment of the contact projections by the dome retaining sheet 16.

While the printed circuit board has been shown and described, it will be readily understood that the XY conductors can be secured to one surface of an insulative board by means other than photo-engraving.

While there have been described above the principles of this invention in connection with specific apparatus, it is to be clearly understood that this description is made only by way of example and not as a limitation to the scope of the invention.

What is claimed is:

[1. In a keyboard switch assembly including a push button manually actuable from an inactive to a switch-actuating position, and a conductive switch member including a resilient element actuated by said push button from a normal to a deflected position and resiliently returning to its normal position upon removal of force from said [bush] *push* button, the improvement comprising an insulative board having opposite surfaces, one only of said surfaces having first and second elongated conductors thereon, said first conductor including a first switch terminal portion and said second conductor including a second switch terminal portion, said conductors and terminal portions being generally coplanar, said switch element being positioned in facing relationship with said one surface and said conductors, said switch element having first and second spaced contact areas thereon, said first contact area engaging said first terminal portion, said second contact area being in registry with said second terminal portion and engaging the same when said element is in said deflected position thereby electrically connecting said first and second terminal portions, and means for holding said push button, switch member and board in operative relationship.]

2. The assembly of claim [1] *23* further comprising a layer of insulating material covering said conductors excluding said terminal portions.

[3. The assembly of claim 2 wherein said element is a snap-acting dome, said second contact area being at the center of said dome, said one surface of said board having a third conductor thereon at least partially surrounding said second terminal portion, closely spaced therefrom and generally coplanar therewith, the area of said dome surrounding said second contact area engaging the insulation covering said third conductor upon further deflection of said dome following engagement of said second contact area with said second terminal portion thereby to protect said second contact area.]

4. [The assembly of claim 1 wherein] *In a keyboard switch assembly including a push button manually actuable from an inactive to a switch-actuating position, and a conductive switch member including a resilient element actuated by said push button from a normal to a deflected position and resiliently returning to its normal position upon removal of force from said push button,* [[*the improvement comprising*]] *an insulative board having opposite surfaces, one only of said surfaces having first and second elongated conductors thereon, said first conductor including a first switch terminal portion and said second conductor including a second switch terminal portion, said conductors and terminal portions being generally coplanar,* the improvement wherein *said switch element* [[*being*]] is a snap-acting dome *positioned in facing relationship with said one surface and said conductors, said* [[*switch element*]] dome *having* a *first* [[*and second spaced*]] *contact* [[*areas*]] area [[*thereon*]] adjacent its periphery and a second contact area adjacent its center, *said first contact area engaging said first terminal portion* in both positions of said dome, *said second contact area being in registry with said second terminal portion and engaging the same when said* [[*element*]] dome *is in said deflected position thereby electrically connecting said first and second terminal portions, and means for holding said push button,* [[*switch member*]] dome *and board in operative relationship,* said one surface of said board [has] *having* at least a third conductor thereon intermediate and spaced from said first and second conductors and generally coplanar therewith, said third conductor extending *between said terminal* [[*portion*]] portions *and* under said [[element]] dome from a location on said one surface remote therefrom, [[*means for maintaining* said element in [its deflected position being spaced from] *spaced relationship with*]] said first contact area being a projection on said dome adjacent the periphery thereof spacing said dome from said third conductor [,] *in both positions of said* [[*element*]] dome *whereby* there [being] *is* no electrical connection between said third conductor and said [[element]] dome in either position thereof.

[[5. The assembly of claim 4 wherein said element is a snap-acting dome, said second contact area being at the center of said dome [, said third conductor being intermediate said first and second terminal portions and generally coplanar therewith.].]]

6. [The assembly of claim 1 wherein] *In a keyboard switch assembly including a push button manually actuable from an inactive to a switch-actuating position, and a conductive switch member including a resilient element actuated by said push button from a normal to a deflected*

*position and resiliently returning to its normal position upon removal of force from said push button, the improvement comprising an insulative board having opposite surfaces, one only of said surfaces having first and second elongated conductors thereon, said first conductor including a first switch terminal portion and said second conductor including a second switch terminal portion, said conductors and terminal portions being generally coplanar, said switch element being positioned in facing relationship with said one surface and said conductors, said switch element having first and second spaced contact areas thereon, said first contact area engaging said first terminal portion, said second contact area being in registry with said second terminal portion and engaging the same when said element is in said deflected position thereby electrically connecting said first and second terminal portions, and means for holding said push button, switch member and board in operative relationship,* said one surface of said board has a third conductor thereon at least partially surrounding said second terminal portion, spaced therefrom and generally coplanar therewith, the area of said element surrounding said second contact area engaging said third conductor upon further deflection of said element following engagement of said second contact with said second terminal portion thereby to protect said element and second contact area.

7. The assembly of claim [1] *23* wherein a section of at least said second conductor extends under said [element] [[*device*]] dome from a location on said one surface remote therefrom.

[[8. The assembly of claim [1] *23* wherein said [element] *device* is a snap-acting dome, said second contact area being at the center of said dome.]]

9. The assembly of claim [[8]] 23 wherein said second contact area comprises a projection on the interior of said dome.

10. [The assembly of claim 8] *In a keyboard switch assembly including a push button manually actuable from an inactive to a switch-actuating position, and a conductive switch member including a resilient element actuated by said push button from a normal to a deflected position and resiliently returning to its normal position upon removal of force from said push button, the improvement comprising an insulative board having opposite surfaces, one only of said surfaces having first and second elongated conductors thereon, said first conductor including a first switch terminal portion and said second conductor including a second switch terminal portion, said conductors and terminal portions being generally coplanar, said switch element being positioned in facing relationship with said one surface and said conductors, said switch element having first and second spaced contact areas thereon, said first contact area engaging said first terminal portion, said second contact area being in registry with said second terminal portion and engaging the same when said element is in said deflected positon thereby electrically connecting said first and second terminal portions, and means for holding said push button, switch member and board in operative relationship, wherein said element is a snap-acting dome, said second contact area being at the center of said dome,* further comprising third, fourth and fifth switch terminals on said one surface of said board, said third through fifth terminals and said first terminal portion being arranged in a rectangle with said second terminal portion in the interior thereof, said first contact area comprising a first projection formed from said dome adjacent the periphery thereof, said dome having second, third and fourth projections formed therefrom adjacent the periphery thereof and respectively engaging said third, fourth and fifth switch terminals, said projections spacing the periphery of said dome from said one surface of said board and said conductor, said second contact area comprising a fifth projection formed from the interior of said dome.

11. The assembly of claim 10 wherein said switch element is generally rectangular with arcuate corners coaxial with the center of said dome, said first through fourth projections being formed from said corners.

12. [The assembly of claim 8 wherein] *In a keyboard switch assembly including a push button manually actuable from an inactive to a switch-actuating position, and a conductive switch member including a resilient element actuated by said push button from a normal to a deflected position and resiliently returning to its normal position upon removal of force from said push button, the improvement comprising an insulative board having opposite surfaces, one only of said surfaces having first and second elongated conductors thereon, said first conductor including a first switch terminal portion and said second conductor including a second switch terminal portion, said conductors and terminal portions being generally coplanar, said switch element being positioned in facing relationship with said one surface and said conductors, said switch element having first and second spaced contact areas thereon, said first contact area engaging said first terminal portion, said second contact area being in registry with said second terminal portion and engaging the same when said element is in said deflected position thereby electrically connecting said first and second terminal portions, and means for holding said push button, switch member and board in operative relationship, wherein said element is a snap-acting dome, said second contact area being at the center of said dome,* said first contact area [comprises] *comprising* a projection on said switch element spacing the periphery of said dome from said surface of said board and said conductors.

13. The assembly of claim 12 wherein said projection is formed from said dome adjacent the periphery thereof.

14. The assembly of claim 13 wherein said switch member includes a flat portion joined to the periphery of said dome, said projection being formed from said flat portion.

15. [The assembly of claim 8] *In a keyboard switch assembly including a push button manually actuable from an inactive to a switch-actuating position, and a conductive switch member including a resilient element actuated by said push button from a normal to a deflected position and resiliently returning to its normal position upon removal of force from said push button, the improvement comprising an insulative board having opposite surfaces, one only of said surfaces having first and second elongated conductors thereon, said first conductor including a first switch terminal portion and said second conductor including a second switch terminal portion, said conductors and terminal portions being generally coplanar, said switch element being positioned in facing relationship with said one surface and said conductors, said switch element having first and second spaced contact areas thereon, said first contact area engaging said first terminal portion, said second contact area being in registry with said second terminal portion and engaging the same when said element is in said deflected position thereby electrically connecting said first and second terminal portions, and means for holding said push button, switch member and board in operative relationship, wherein said element is a snap-acting dome, said second*

*contact area being at the center of said dome and* further comprising third and fourth switch terminals on said one surface of said board, said third and fourth terminals and said first terminal portion being arranged in a triangle with said second terminal portion in the interior thereof, said first contact area comprising a first projection formed from said dome adjacent the periphery thereof, said dome having second and third projections formed therefrom adjacent the periphery thereof and respectively engaging said third and fourth switch terminals, said projections spacing the periphery of said dome from said one surface of said board and said conductors, said second contact area comprising a fourth projection formed from the interior of said dome.

16. The assembly of claim 15 wherein said switch element is generally triangular with arcuate apices coaxial with the center of said dome, said first, second and third projections being formed from said apices.

17. The assembly of claim 16 wherein said holding means comprises a layer of insulating material covering said conductors excluding said terminal portions and terminals, a first sheet of insulating material covering said layer and having an opening therein receiving said switch element and conforming thereto for locating the same, a second sheet of insulating material covering said first sheet and switch element, and a plate member covering said second sheet and having an opening therein receiving said push button, said push button acting on said dome through said second sheet.

18. The assembly of claim 16 wherein a section of at least said second conductor extends under said dome from a location on said one surface remote therefrom, said one surface of said board having a third conductor thereon at least partially surrounding said second terminal portion, spaced thereof and generally coplanar therewith, said conductors exclusive of said terminal portions having a layer of insulating material thereon, the area of said dome surrounding said fourth projection engaging the insulation covering said third conductor upon further deflection of said dome following engagement of said second contact area with said second terminal portion thereby to protect said fourth projection.

19. The assembly of claim 18 wherein said third conductor completely surrounds said second terminal portion and is joined to said second conductor.

20. The assembly of claim 18 wherein said third conductor partially surrounds said second terminal portion and is joined to a fourth conductor on said one surface of said board which extends under said dome.

21. The assembly of claim 18 wherein said first conductor is joined to at least said [second] *third* terminal.

22. The assembly of claim 18 wherein said board has a fourth conductor thereon which extends under said dome.

*23. In a keyboard switch assembly including a resilient, conductive switch device manually actuable from a normal to a deflected position, said switch device resiliently returning to its normal position upon removal of force therefrom,* [[*the improvement comprising*]] and *an insulative member having opposite surfaces, one of said surfaces having first and second elongated conductors thereon, said first conductor including a first switch terminal portion and said second conductor including a second switch terminal portion, said conductors and terminal portions being generally coplanar,* the improvement wherein *said switch device* [[*being*]] is a snap-acting dome *positioned in facing relationship with said one surface and said conductors, said* [[*switch device*]] dome *having* a *first* contact area adjacent its periphery and a *second* [[*spaced*]] *contact* [[*areas*]]area [[*thereon*]] adjacent its center, *said contact areas being respectively in registry with said terminal portions*[[*and*]], said first contact area *engaging* [[*the same*]] said first terminal portion in both positions of said dome, said second contact area engaging said second terminal portion *when said* [[*device*]] dome *is in said deflected position thereby electrically connecting said terminal portions,* [[*at least one of*]] *said* second *contact* [[*areas*]]area *being spaced from* [[*the respective*]] said second *terminal portion in said normal position of said device, said one surface of said member having at least a third conductor thereon intermediate and spaced from said first and second conductors and generally coplanar therewith, said third conductor extending between said* [[*contact areas*]] terminal portions *and under said* [[*device*]] dome *from a location on said one surface remote therefrom,* [[*means for maintaining said device in spaced relationship with*]] said first contact area being a projection on said dome adjacent the periphery thereof spacing said dome from *said third conductor in both positions of said* [[*device*]] dome *whereby there is no electrical connection between said third conductor and said* [[*device*]] dome *in either position thereof, and means for holding said* [[*switch device*]] dome *and insulative member in operative relationship.*

*24. The assembly of claim* [[*8*]] 23 *further comprising third and fourth switch terminals on said one surface of said member, said third and fourth terminals and said first terminal portion being arranged in a triangle with said second terminal portion in the interior thereof,* [[*said first contact area comprising a first projection formed from said dome adjacent the periphery thereof*]] *said dome having second and third projections formed* [[*therefrom*]] thereon *adjacent the periphery thereof and respectively engaging said third and fourth switch terminals, said projections spacing the periphery of said dome from said one surface of said board and said conductors, said second contact area comprising a fourth projection formed from the interior of said dome*[[*, said maintaining means comprising said first, second and third projections*]].

*25. The assembly of claim 24 wherein said switch device is generally triangular with arcuate apices coaxial with the center of said dome, said first, second and third projections being formed from said apices.*

*26. The assembly of claim 2 wherein* [[*said device is a snap-acting dome, said first contact area engaging said first terminal portion in both positions of said device, said second contact area being at the center of said dome and being spaced from said second contact area in said normal position of said device,*]] *said one surface of said member* [[*having*]] has *a fourth conductor thereon spaced from said third conductor and first terminal portion and at least partially surrounding said second terminal portion, closely spaced therefrom and generally coplanar therewith, the area of said dome surrounding said second contact area engaging the insulation covering said fourth conductor upon further deflection of said dome following engagement of said second contact area with said second terminal portion thereby to protect said second contact area.*

27. The assembly of claim 12 wherein a section of at least said second conductor extends under said dome from a location on said one surface remote therefrom.

* * * * *

UNITED STATES PATENT AND TRADEMARK OFFICE

CERTIFICATE OF CORRECTION

PATENT NO. : Re. 30,923

DATED : May 4, 1982

INVENTOR(S) : Durkee, et al

It is certified that error appears in the above—identified patent and that said Letters Patent is hereby corrected as shown below:

Column 11, Line 35 "thereof" should be --thereon--

Signed and Sealed this

*Twenty-second* Day of *February 1983*

[SEAL]

*Attest:*

GERALD J. MOSSINGHOFF

*Attesting Officer*

*Commissioner of Patents and Trademarks*